C. D. ELDER.

CREAM TRANSPORTATION TANK.

No. 10,643. Reissued Sept. 1, 1885.

WITNESSES

J. L. Durand
A. L. Morsell.

INVENTOR

Cornelius D. Elder,
By Louis Bagger & Co.
Attorney

N. PETERS, Photo-Lithographer, Washington, D. C.

UNITED STATES PATENT OFFICE.

CORNELIUS D. ELDER, OF OSAGE, IOWA.

CREAM-TRANSPORTATION TANK.

SPECIFICATION forming part of Reissued Letters Patent No. 10,643, dated September 1, 1885.

Original No. 285,348, dated September 18, 1883. Application for reissue filed June 18, 1885.

*To all whom it may concern:*

Be it known that I, CORNELIUS D. ELDER, a citizen of the United States, residing at Osage, in the county of Mitchell and State of Iowa, have invented certain new and useful Improvements in Cream-Transportation Tanks; and I do hereby declare that the following is a full, clear, and exact description of the invention, that will enable others skilled in the art to which it appertains to make and use the same, reference being had to the accompanying drawings, which form part of this specification, and in which—

Figure 1:
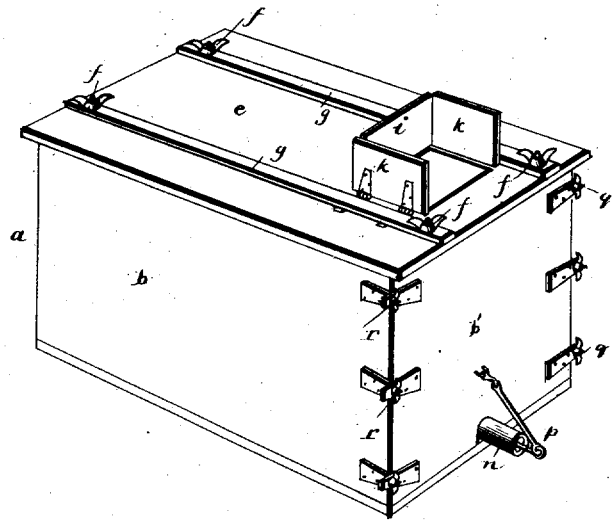
Figure 4:
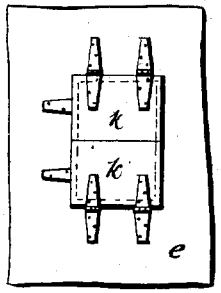
Figure 3:
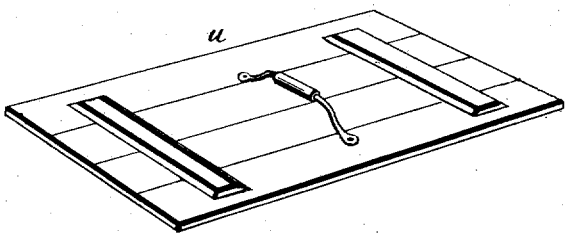
Figure 2:
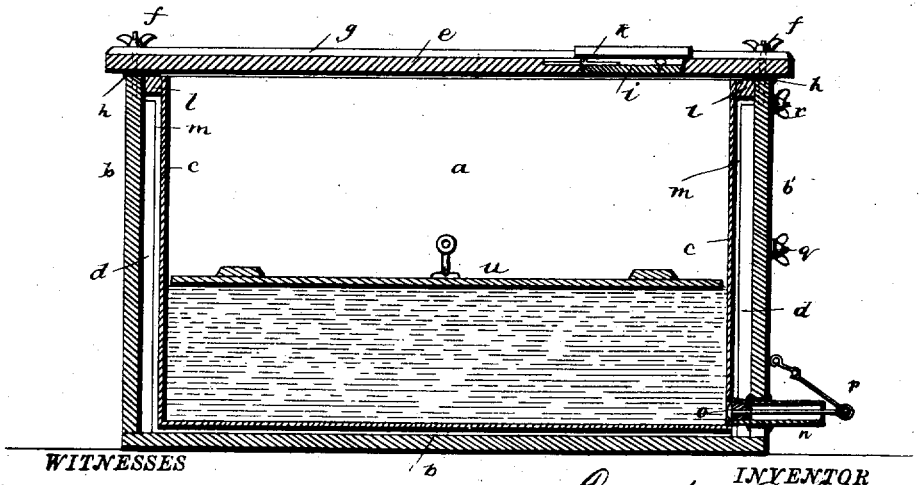

Figure 1 represents a perspective view of my improved cream-transportation tank. Fig. 2 is a longitudinal vertical sectional view of the same. Fig. 3 is a perspective view of the float, and Fig. 4 is a plan or top view of the folding wings which cover the door in the removable cover.

Similar letters of reference indicate corresponding parts in all the figures.

This invention has relation to cream-transportation tanks; and it consists in the novel construction and combination of parts, as will be hereinafter more fully described, and particularly pointed out in the claims.

The objections to the cans and fixtures heretofore used in the transportation of cream are, among others, that the cream is liable to freeze in winter, and to become too hot and sour in summer; and the object of my improvement is to construct a transportation-tank which will overcome this difficulty, and in which the cream may be kept sweet without regard to the season, if proper care is taken to keep the tank clean.

In the accompanying drawings, *a* designates the body of the tank, which consists of an outer casing, *b*, of wood, and an inside removable wall or lining, *c*, of metal, a dead-air space being provided between the casing and the lining to render the walls non-conductive of heat and cold, to that degree, at least, that will prevent the cream in the tank from freezing in winter or becoming too hot in summer.

The entire top or cover *e* of the tank is made removable, and is fastened to the tank-body by four bolts and nuts, *f*, two at each end of the tank-body, and two binding strips or sticks, *g g*, which extend over the cover from end to end of the same. The cover and strips are slotted to receive the fastening-bolts. A rubber gasket or packing, *h*, is interposed between the cover and tank-body, and the nuts turned down to secure the cover in place, thereby rendering the joint between the cover and tank-body air-tight, so that should the filled tank be upset no cream would be spilled. The cover is provided with a hinged door, *i*, through which the cream is poured into the tank as it is gathered, and this door is also provided with a suitable packing, so as to render it air and water tight and prevent leakage.

In order to prevent the cream from being blown by the wind and wasted as it is being poured into the tank, I provide two wings or flaps, *k k*, hinged one at each end of the door *i*, so as to fold down inwardly upon the door when closed, but which may be turned up vertically when the door is to be opened, and together with the door form guards on three sides of the opening, through which the cream is poured, as illustrated in Fig. 1 of the drawings.

The lining *c* is secured to a strong frame, *l*, of suitable material, at its upper edge, and stays *m* extend from said frame *l* to the bottom of the casing *b*, between the lining and the casing, for the purpose of preventing the lining from being bent or jammed by rough usage. These stays may be secured within the space between the lining and the casing by any well-known means.

*n* designates the draw-off pipe, which may be of iron or heavy tin, and is provided with a stopper or cork, *o*, on the inside of the tank, which is worked by a rod, *p*, passing through the pipe, by which the stopper may be pushed out to open or pulled in to close the pipe. The rod *p* is jointed, so that it may be turned over the the outer end of the pipe and fastened to the tank when the pipe is closed, so that there will be no danger of the rod becoming loose unless it is desired to open the outlet to draw the cream. The cork should be weighted to prevent it from floating when pushed out of the pipe.

If desired, a stop-cock may be used; but I prefer to use the cork and jointed rod for closing the pipe, as it is simple, and can be very easily cleaned.

The end of the casing *b'* is made removable by means of the bolts and nuts *q r*, so that by loosening said bolts and nuts this end may be taken off, and the lining *c* may be slipped out of the casing for repairs, or for any other purpose, whenever desired.

The float *u* is made of light wood, and should be smooth on its under side, which rides on the cream. It is not designed to hold the cream in the tank; but is simply intended to steady it and prevent it from splashing or churning, although working freely in the tank.

Having thus described my invention, I claim and desire to secure by Letters Patent of the United States—

1. In a cream-transportation tank, the combination of the lining having the drawing-off tube or pipe, and the casing with a removable end having an aperture for said tube, substantially as set forth.

2. In a cream-transportation tank, the combination of the removable lining having the drawing-off tube or pipe, and the casing having a removable end having an aperture for said tube, substantially as set forth.

3. In a cream-transportation tank, the combination of the removable lining having the drawing-off tube or pipe, the casing with a removable end having an aperture for said tube, and the removable cover, substantially as set forth.

4. The combination, in a cream-transportation tank, of the removable lining having the drawing off tube or pipe, the casing with a removable end having an aperture for said tube, the removable cover having a hinged door suitably packed, and the wings or flaps adapted to fold sidewise upon the door when the same is closed, substantially as set forth.

5. The cover constructed with a hinged door suitably packed, and having the wings or flaps hinged on opposite sides of the door, and adapted to fold down upon the same when it is closed, whereby guards are formed on three sides of the opening when the door is raised, substantially as set forth.

In testimony whereof I have hereto affixed my signature in presence of two witnesses.

CORNELIUS D. ELDER.

Witnesses:
J. H. SWENEY,
C. P. SHEEHAN.